(12) United States Patent  
Chen et al.

(10) Patent No.: US 8,924,650 B2  
(45) Date of Patent: Dec. 30, 2014

(54) SYNCHRONIZING NETWORK FEEDS IN HIGH-FREQUENCY NETWORK EVENTS

(75) Inventors: Benson Kwuan-Yi Chen, Durham, NC (US); Michael Gilfix, Austin, TX (US); Victor S. Moore, Lake City, FL (US); Anthony William Wrobel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 12/207,005

(22) Filed: Sep. 9, 2008

(65) Prior Publication Data

US 2010/0063995 A1  Mar. 11, 2010

(51) Int. Cl.
G06F 12/00 (2006.01)
H04L 29/08 (2006.01)
G06F 17/30 (2006.01)

(52) U.S. Cl.
CPC ...... *G06F 17/30902* (2013.01); *H04L 67/2852* (2013.01)
USPC ............ 711/133; 711/118; 711/138; 709/222

(58) Field of Classification Search
USPC ........................................................ 709/222
See application file for complete search history.

(56) References Cited

U.S. PATENT DOCUMENTS

| 2005/0033926 A1* | 2/2005 | Dumont ........................ 711/138 |
| 2006/0195660 A1* | 8/2006 | Sundarrajan et al. ......... 711/118 |
| 2006/0288011 A1* | 12/2006 | Gandhi et al. .................. 707/10 |
| 2007/0156965 A1* | 7/2007 | Sundarrajan et al. ......... 711/133 |
| 2007/0156966 A1* | 7/2007 | Sundarrajan et al. ......... 711/133 |
| 2008/0195819 A1* | 8/2008 | Dumont ........................ 711/138 |

FOREIGN PATENT DOCUMENTS

| WO | WO 2006/081032 A2 | 8/2006 | .............. H04L 29/08 |
| WO | WO 2006081032 A2 * | 8/2006 | |

OTHER PUBLICATIONS

James M Snell, "Synchronization and offline clients", www.imc.org/atom-protocol/mail-archive/mgs05616.html, Jul. 2006.
Fielding et al., "Hypertext Transfer Protocol—HTTP/1.1; rfc2616.txt," IETF Standard, Internet Engineering Task Force, IETF, CH, Jun. 1, 1999 XP015008399, ISSN: 0000-0003.
International Search Report and Written Opinion for PCT Application No. PCT/EP2009/061643, mailed Dec. 18, 2009, 9 pages.

* cited by examiner

*Primary Examiner* — Hamza Algibhah
*Assistant Examiner* — Natisha Cox
(74) *Attorney, Agent, or Firm* — VanLeeuwen & VanLeeuwen; Jeffrey S. LaBaw (57) ABSTRACT

A cache server receives a request from a client that includes a requesting entity tag. In turn, the cache server extracts a starting identifier and an ending identifier from the requesting entity tag. The starting identifier is associated with a starting entry and the ending identifier is associated with an ending entry. Next, the cache server determines whether a subsequent entity tag exists that includes a subsequent starting identifier that matches the requesting entity tag's ending identifier. When the cache server identifies a subsequent entity tag, the cache server sends the subsequent entity tag and one or more update entries corresponding to the subsequent entity tag to the client.

20 Claims, 6 Drawing Sheets

SYNCHRONIZING NETWORK FEEDS IN HIGH-FREQUENCY NETWORK EVENTS

BACKGROUND OF THE INVENTION

1. Technical Field

The present invention relates to synchronizing network feeds in high frequency network events. More particularly, the present invention relates to utilizing a starting and ending identifier encoded into an entity tag (ETAG) in order for a cache server to identify and provide unique web feed update entries to clients without querying a feed server.

2. Description of the Related Art

Web feeds are commonly used in Web 2.0 to syndicate information between distributed data sources, such as those adhering to an RSS standard (Really Simple Syndication, RDF Site Summary, or Rich Site Summary) or an Atom standard (Atom Syndication Format or Atom Publishing Protocol). A client may "subscribe" to a web feed in order to receive web feed updates and provide up-to-date information to a user. A cache server typically resides between clients and a feed server to receive web feed update information from the feed server and provide the update information to the clients. The invention described pertains to improving the efficiency of the cache server.

SUMMARY

A cache server receives a request from a client that includes a requesting entity tag. In turn, the cache server extracts a starting identifier and an ending identifier from the requesting entity tag. The starting identifier is associated with a starting entry and the ending identifier is associated with an ending entry.

Next, the cache server determines whether a subsequent entity tag exists that includes a subsequent starting identifier that matches the requesting entity tag's ending identifier. When the cache server identifies a subsequent entity tag, the cache server sends the subsequent entity tag and one or more update entries corresponding to the subsequent entity tag to the client.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
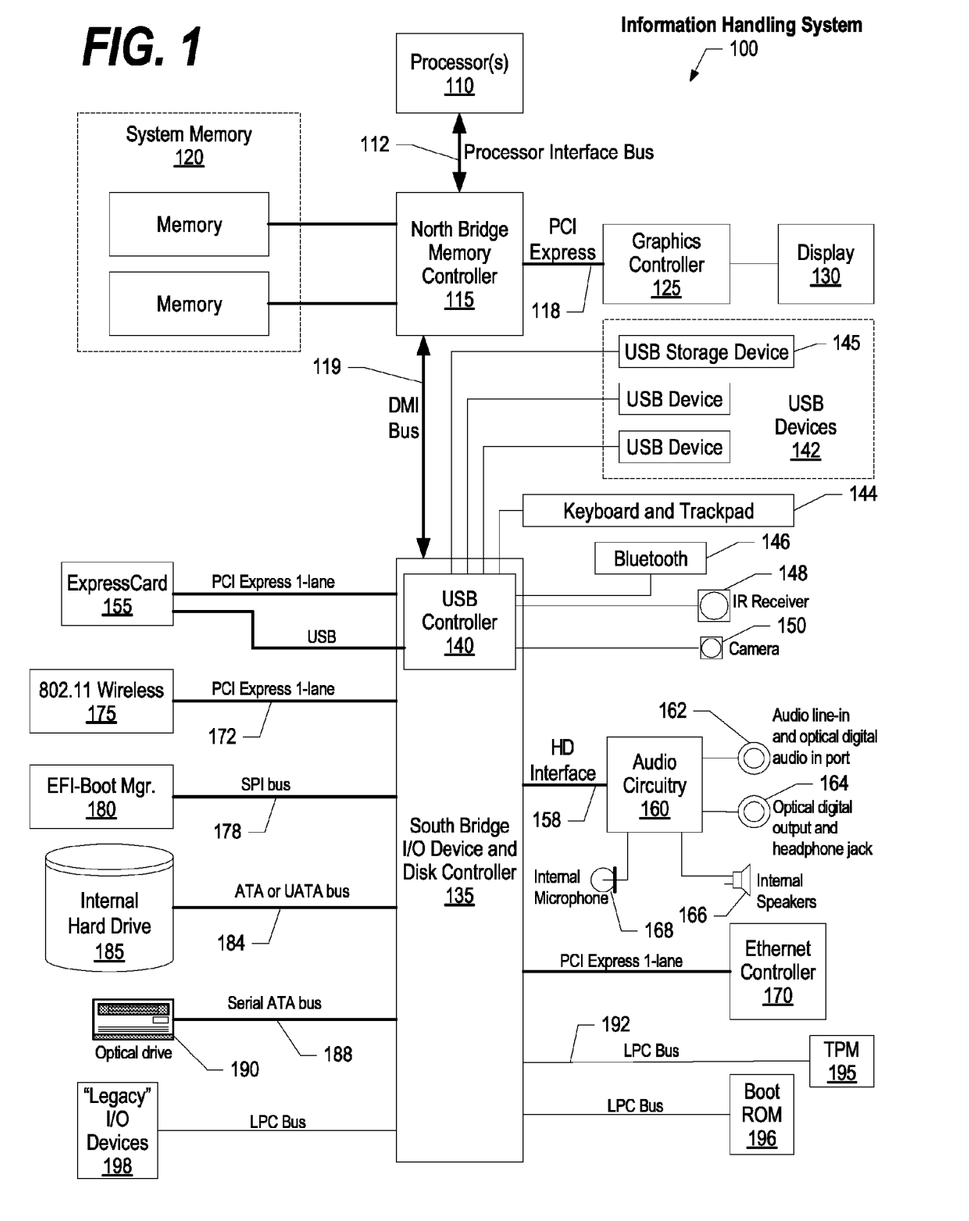
FIG. 1 is a block diagram of a data processing system in which the methods described herein can be implemented.
Figure 2:
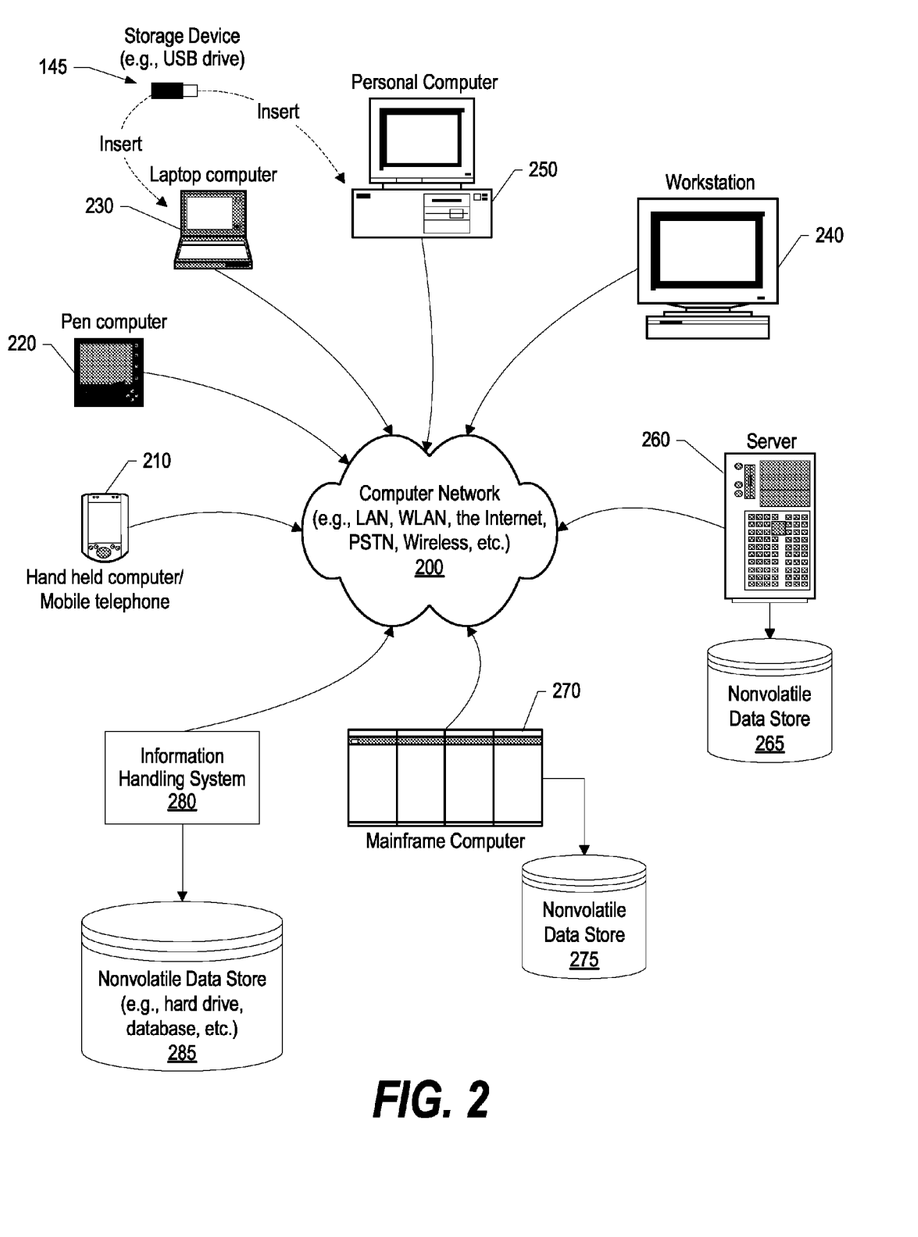
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components.

These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
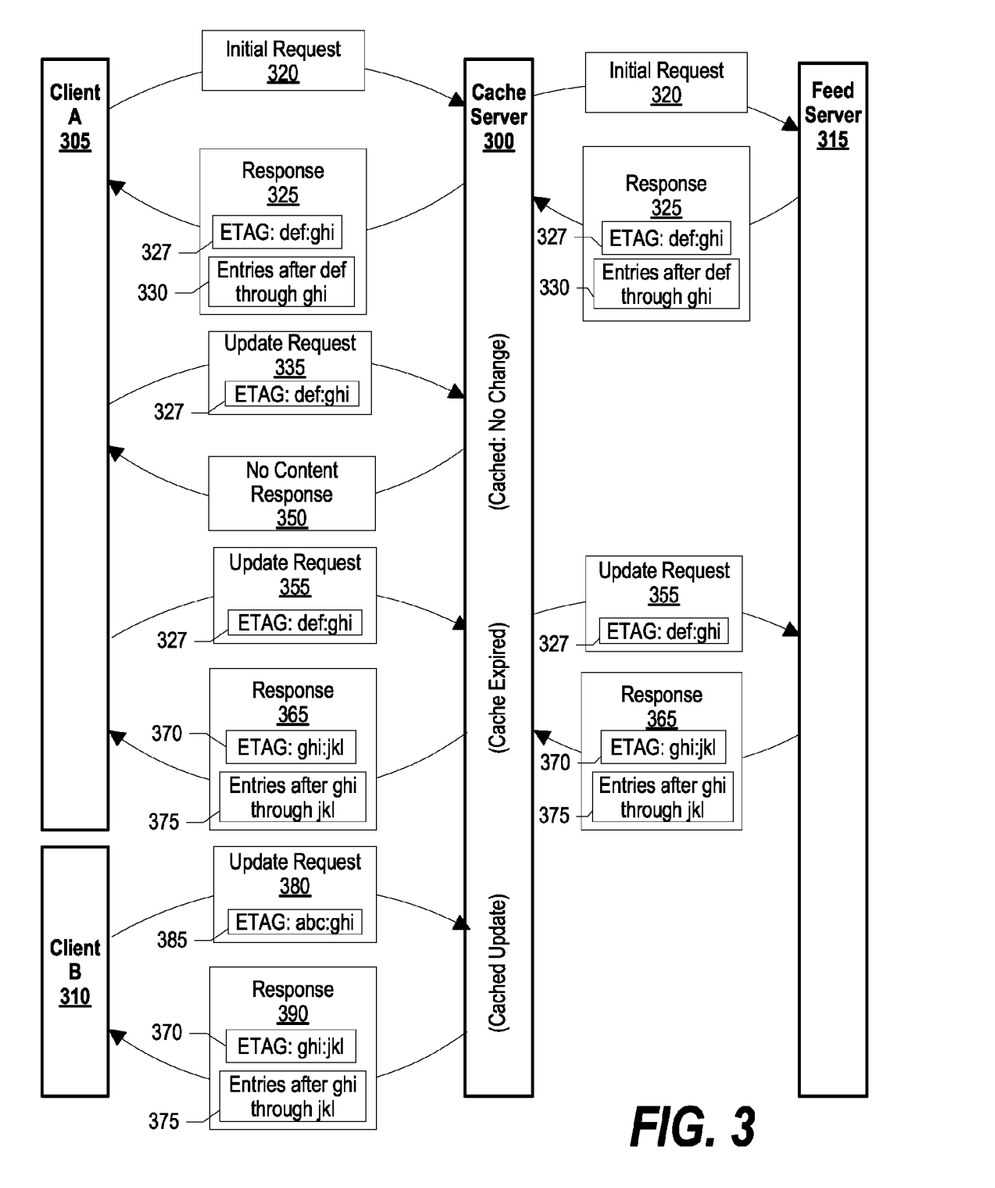
FIG. 3 is a diagram showing a sample embodiment of a cache server providing feed update entries to clients based upon entity tag (ETAG) starting identifiers and ending identifiers.

FIG. 3 is a diagram showing a cache server providing feed update entries to clients based upon entity tag (ETAG) starting identifiers and ending identifiers. Cache server 300 communicates with feed server 315 to provide web feed updates to clients A 305 and B 310. By utilizing an ETAG's starting identifier, cache server 300 minimizes requests to feed server 315 for update information. As those skilled in the art can appreciate, a web feed may be a document that includes a chain of frequently updated information, such as those adhering to an RSS standard or Atom standard.

Client A 305 sends initial request 320 to cache server 300, requesting updates for the particular feed. Cache server 300 detects that initial request 320 is client A 305's first request because no ETAG is present, and forwards initial request 320 to feed server 315.

In turn, feed server 315 returns response 325 to cache server 300, which includes the most recent set of updates 330 for the feed (e.g., last ten updates) along with corresponding ETAG 327. ETAG 327 includes a starting identifier of "def" along with an ending identifier of "ghi," which identifies the most recent update entry. Update entries 330 include update entries between an entry after "def's" entry through entry "ghi." In turn, cache server 300 forwards response 325 to client A 305, and stores ETAG 327 and update entries 330 in a cached repository. Client 305 receives response 325 and updates its web feed with update entries 330 and stores ETAG 327 for later requests.

At a scheduled interval, client A 305 sends another update request 335 to cache server 300. This time update request includes the recently stored ETAG 327. Cache server 300 checks its repository to see if an ETAG exists that match the criteria discussed above. Since ETAG 327 and update entries 330 are still cached from response 325, cache server sends "No Content" response 350 to client A 305, informing client A that there are no new updates to the feed.

At the next scheduled interval, client A 305 sends update request 355 to cache server 300, which still includes ETAG 327 since client A 305 has not received a new ETAG. Again, cache server 300 checks its repository to see if an ETAG exists that matches the criteria discussed above. This time cache server 300's cache has expired, thus flushing out ETAG 327 and update entries 330. As a result, cache server 300 forwards update request 355 to feed server 315.

Feed server 315 determines that new updates are available and provides response 365 to cache server 300 that includes ETAG 370 and update entries 375. Update entries 375 include a block of entries between an entry after "ghi's" entry through entry jkl. In turn, cache server 300 forwards response 365 to client A 305 and also stores ETAG 370 and update entries 375 in the cached repository. Client A 305 receives response 365 and updates its web feed with update entries 375 and stores ETAG 370 for later requests.

Regarding client B 310, the example shown in FIG. 3 assumes that client B 310 has previously made an initial request and received a response that included different ETAG with a starting identifier of "abc" and an ending identifier of "ghi." At client B 310's scheduled interval, client B 310 sends update request 380 to cache server 300, which includes ETAG 385. Cache server 300 checks its repository to see if an ETAG exists that match the criteria discussed above. This time, cache server 300 identifies cached ETAG 370, which has a starting identifier that matches ETAG 380's ending identifier. As a result, cache server 300 sends response 380 to client B 310, which includes ETAG 370 and corresponding update entries 375. In turn, client B 310 updates its feed with update entries 375 and stores ETAG 370 for later requests. As can be seen, since cache server 300 matched ETAG 385's ending identifier with ETAG 375's starting identifier, cache server 300 was not required to send a request to feed server 315, thus reducing workload and bandwidth consumption.

Figure 4:
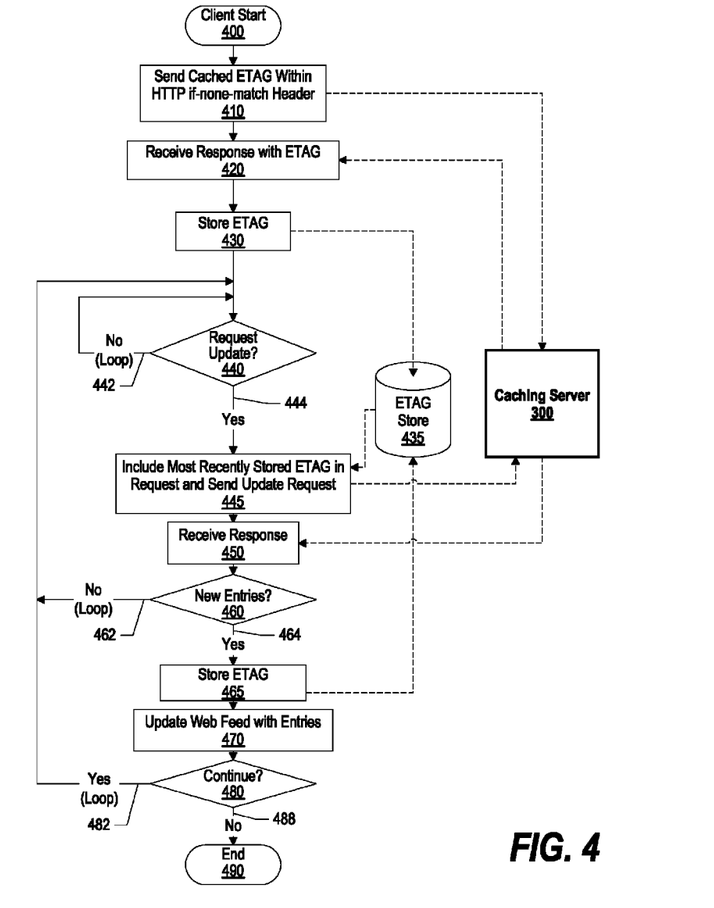
FIG. 4 is a flowchart showing steps taken in a client interacting with a cache server in order to receive web feed updates in a sample embodiment.

FIG. 4 is a flowchart showing steps taken in a client interacting with a cache server in order to receive web feed updates. Client processing commences at 400, whereupon client processing sends an ETAG within an if-none-match HTTP header to cache server 300 (step 410), which informs cache server to provide a particular web feed, along with updates, to the client. Cache server 300 processes the client request, which may include communicating with a feed server, and provides a response to the client (see FIGS. 5-6, and corresponding text for further details). The response includes an ETAG that includes a starting identifier and an ending identifier that correspond with web feed update entries. Each web feed update entry identifies new information not yet received by the client.

Processing receives the response from cache server 300 at step 420 and, at step 430, processing stores the ETAG in ETAG store 435. The client utilizes the stored ETAG during subsequent update requests to cache server 300 (see below). ETAG store 435 may be stored on a volatile or nonvolatile storage area, such as computer memory or a computer hard drive.

A determination is made as to whether to request an update from cache server (decision 440). For example, the client may be configured to request updates every ten seconds in order to provide the client's user with up-to-date information. If processing should not request an update, decision 440 branches to "No" branch 442, which loops back to monitor the update request interval. This looping continues until processing should request an update, at which point decision 440 branches to "Yes" branch 444.

At step 445, processing retrieves the most recently stored ETAG from ETAG store 435 that, at this point, is the ETAG that was stored at step 430, and includes the ETAG in a request to send to cache server 300. Cache server 300 processes the request and sends a response, which the client receives at step 450.

A determination is made as to whether the response includes new entries (decision 460). For example, the response may include a subsequent ETAG and corresponding update entries. In this example, cache server 300 may have the subsequent ETAG and update entries cached in response to a different client's request. Or, cache server 300 may have communicated with a feed server in order to receive the update entries. In another example, cache server 300 may have a cached ETAG that includes the same starting identifier and the same ending identifier as the ETAG that was sent by the client. In this example, cache server 300 determines that the client has the most recent updates and sends a "No Content" response to the client (see FIG. 5 and corresponding text for further details).

If the response does not include new entries, decision 460 branches to "No" branch 462, which loops back to request more updates. This looping continues until cache server 300 sends a response that includes new entries, at which point decision 460 branches to "Yes" branch 464, whereupon processing stores a subsequent ETAG, which is included in the response, in ETAG store 418. The subsequent ETAG includes a subsequent starting identifier and a subsequent ending identifier. The subsequent starting identifier is the same as the ending identifier that was included in the ETAG that was sent at step 445. The ending identifier identifies the most recent update entry included in the response. At step 470, processing updates the web feed with the update entries included in the response.

A determination is made as to whether to continue processing (decision 480). If processing should continue, decision 480 branches to "Yes" branch 482, which loops back to request and receive more updates. This looping continues until client processing should terminate, at which point decision 480 branches to "No" branch 488 whereupon processing ends at 490.

Figure 5:
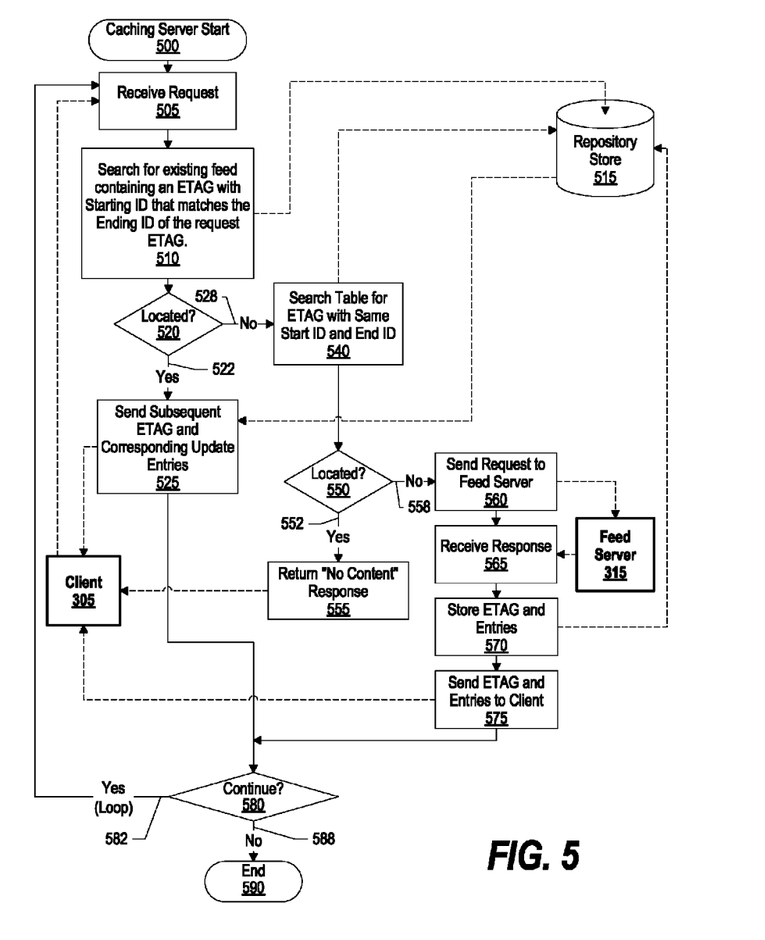
FIG. 5 is a flowchart showing steps taken in a cache server processing client requests for update in a sample embodiment.

FIG. 5 is a flowchart showing steps taken in a cache server processing client requests for update. Caching processing commences at 500, whereupon processing receives a web feed request from client 305 at step 505. The client request includes a requesting ETAG that includes a starting identifier and an ending identifier. The example shown in FIG. 5 assumes that client 305 previously sent an ETAG within an if-none-match HTTP header to set up the web feed.

At step 510, processing searches repository store 515 for a subsequent ETAG corresponding to the same web feed that includes a starting identifier that matches the ending identifier included in client 305's request, thus indicating that repository store 515 includes more recent update entries for the client.

A determination is made as to whether processing located a subsequent ETAG (decision 520). If processing located a subsequent ETAG, decision 520 branches to "Yes" branch 522, whereupon processing sends the subsequent ETAG and corresponding update entries to client 305 at step 525.

On the other hand, if processing did not locate a subsequent ETAG, decision 520 branches to "No" branch 528 whereupon processing searches repository store 515 for a duplicate ETAG that includes the same starting identifier and the same ending identifier as the ETAG included in the request (step 540), thus indicating that the client has the most recent update entries.

A determination is made as to whether processing located a duplicate ETAG in repository store 515 (decision 550). If processing located a duplicate ETAG, decision 550 branches to "Yes" branch 552 whereupon processing returns a "No Content" response to client 305, which informs client 305 that no new update entries are available.

On the other hand, if processing did not locate a duplicate ETAG, thus indicating that the cache server's cache has expired, decision 550 branches to "No" branch 558 whereupon processing sends a request to feed server 315 at step 560. The request includes the same ETAG that was included in client 305's request that was received at step 305.

At step 565, processing receives a response from feed server 315 and, at step 570, processing stores the new ETAG (which includes new starting identifier and new ending identifier) and new update entries in repository store 515. Processing, at step 575, sends the new ETAG and the new update entries to client 305. In turn, client 305 updates the web feed to present to a user. When feed server 315 does not have new updates to provide, processing still stores the new ETAG into repository store 515, which indicates that the ETAG is the latest version for that starting and end ID, and sends a "NO CONTENT" response to client 305.

A determination is made as to whether to continue processing (decision 580). If processing should continue, decision 580 branches to "Yes" branch 582, which loops back to receive and process more client requests. This looping continues until processing should terminate, at which point decision 580 branches to "No" branch 588, whereupon processing ends at 590.

Figure 6:
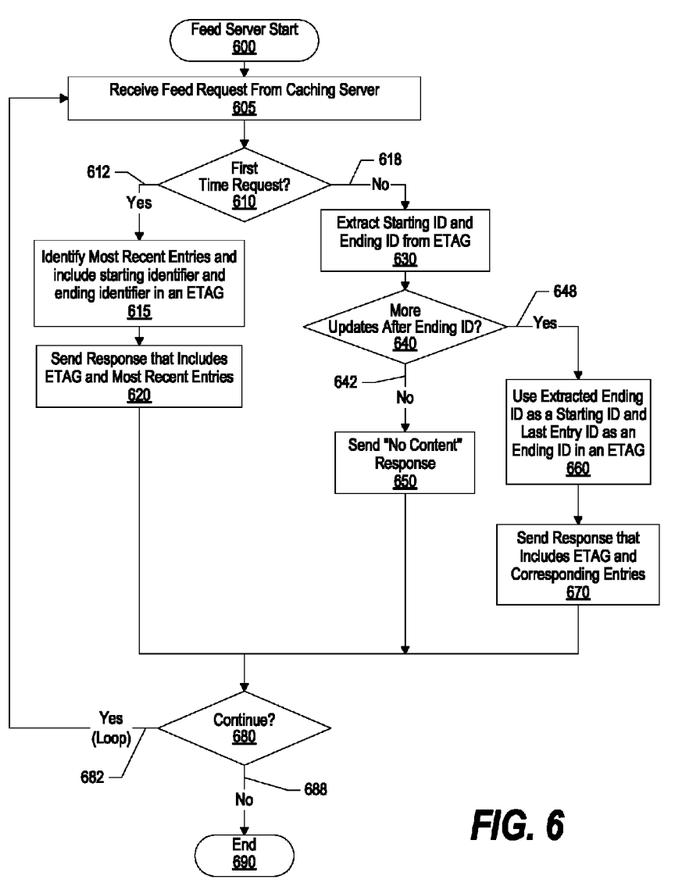
FIG. 6 is a flowchart showing steps taken in a feed server processing cache server requests in a sample embodiment.

FIG. 6 is a flowchart showing steps taken in a feed server processing cache server requests. In one embodiment, a feed server may interact directly with a client in order to provide web feed updates. Feed sever processing commences at 600, whereupon processing receives a request from a requestor (cache server or client) at step 605.

A determination is made as to whether the requestor is requesting a web feed for the first time (decision 610). If the request is a first time request, decision 610 branches to "Yes" branch 612, whereupon processing identifies the most recent update entries for the web feed, such as the last ten updates, and includes corresponding starting identifiers and ending identifiers in an ETAG (step 615). At step 620, processing sends a response that includes the ETAG and the most recent updates to the requestor.

On the other hand, if the request is not a first time request, decision 610 branches to "No" branch 618, whereupon processing extracts the starting identifier and the ending identifier from the ETAG included in the request (step 630). A determination is made as to whether there are new update entries that occurred after the update entry corresponding to the extracted ending identifier (decision 640). If there are no new update entries, decision 640 branches to "No" branch 642, whereupon processing sends a "No Content" response back to the requestor.

On the other hand, if there are new update entries available, decision 640 branches to "Yes" branch 648, whereupon processing uses the extracted ending identifier as a new starting identifier and uses the last entry identifier (corresponding to the most recent update entry) as a new ending identifier, and creates a new ETAG that includes the new starting identifier and the new ending identifier (step 660). At step 670, processing sends a response to the requestor that includes the new ETAG along with update entries that include entries occurring after the ending entry through an entry that corresponds to the new ending identifier.

A determination is made as to whether to continue processing (decision 680). If processing should continue, decision 680 branches to "Yes" branch 682, which loops back to process more requests. This looping continues until processing should terminate, at which point decision 680 branches to "No" branch 688 whereupon processing ends at 690.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
receiving a request from a client, the request including a first entity tag that includes a first starting identifier and a first ending identifier, the first starting identifier associated with a starting entry and the first ending identifier associated with an ending entry;

selecting a second entity tag that corresponds to one or more update entries;

determining whether the second entity tag includes a second starting identifier that matches the first ending identifier included in the first entity tag; and in response to determining that the second entity tag includes the second starting identifier that matches the first ending identifier, sending the second entity tag and one or more of the update entries to the client.

2. The method of claim 1 further comprising:

in response to determining that the second entity tag does not include the second starting identifier that matches the first ending identifier, determining whether a third entity tag includes a third starting identifier that matches the first starting identifier and includes a third ending identifier that matches the first ending identifier;

in response to determining that the third entity tag exists, sending a no content response to the client.

3. The method of claim 2 further comprising:

in response to determining that the third entity tag does not exist, sending a request to a feed server, wherein the request includes the first entity tag;

receiving a response from the feed server, wherein the response includes a new entity tag and one or more corresponding new update entries, the new entity tag including a new starting identifier and a new ending identifier; and sending the new entity tag and the one or more new update entries to the client.

4. The method of claim 3 wherein the new starting identifier matches the first ending identifier.

5. The method of claim 3 further comprising:

storing the new entity tag and the one or more new update entries in a repository; and providing the new entity tag and the one or more new update entries to a different client.

6. The method of claim 1 wherein the one or more update entries comprise entries occurring after the ending entry through a subsequent entry corresponding to the second ending identifier.

7. The method of claim 1 further comprising:

wherein the client is adapted to update a web feed using the one or more update entries; and wherein the client is adapted to include the second entity tag in a subsequent request.

8. An information handling system comprising:

one or more processors;

a memory accessible by at least one of the processors;

a nonvolatile storage area accessible by at least one of the processors;

a set of instructions stored in the memory and executed by at least one of the processors in order to perform actions of:

receiving a request from a client, the request including a first entity tag that includes a first starting identifier and a first ending identifier, the first starting identifier associated with a starting entry and the first ending identifier associated with an ending entry;

selecting a second entity tag that corresponds to one or more update entries;

determining whether the second entity tag includes a second starting identifier that matches the first ending identifier included in the first entity tag; and in response to determining that the second entity tag includes the second starting identifier that matches the first ending identifier, sending the second entity tag and one or more of the update entries to the client.

9. The information handling system of claim 8 wherein the set of instructions performs actions of:

in response to determining that the second entity tag does not include the second starting identifier that matches the first ending identifier, determining whether a third entity tag includes a third starting identifier that matches the first starting identifier and includes a third ending identifier that matches the first ending identifier;

in response to determining that the third entity tag exists, sending a no content response to the client.

10. The information handling system of claim 9 wherein the set of instructions performs actions of:

in response to determining that the third entity tag does not exist, sending a request to a feed server, wherein the request includes the first entity tag;

receiving a response from the feed server, wherein the response includes a new entity tag and one or more corresponding new update entries, the new entity tag including a new starting identifier and a new ending identifier; and sending the new entity tag and the one or more new update entries to the client.

11. The information handling system of claim 10 wherein the new starting identifier matches the first ending identifier.

12. The information handling system of claim 10 wherein the set of instructions performs actions of:

storing the new entity tag and the one or more new update entries in a repository; and providing the new entity tag and the one or more new update entries to a different client.

13. The information handling system of claim 8 wherein the one or more update entries comprise entries occurring after the ending entry through a subsequent entry corresponding to the second ending identifier.

14. A computer program product stored on a non-transitory computer operable medium, comprising functional descriptive material that, when executed by an information handling system, causes the information handling system to perform actions that include:

receiving a request from a client, the request including a first entity tag that includes a first starting identifier and a first ending identifier, the first starting identifier associated with a starting entry and the first ending identifier associated with an ending entry;

selecting a second entity tag that corresponds to one or more update entries;

determining whether the second entity tag includes a second starting identifier that matches the first ending identifier included in the first entity tag; and in response to determining that the second entity tag includes the second starting identifier that matches the first ending identifier, sending the second entity tag and one or more of the update entries to the client.

15. The computer program product of claim 14 wherein the information handling system further performs actions that include:

in response to determining that the second entity tag does not include the second starting identifier that matches the first ending identifier, determining whether a third entity tag includes a third starting identifier that matches the first starting identifier and includes a third ending identifier that matches the first ending identifier;

in response to determining that the third entity tag exists, sending a no content response to the client.

16. The computer program product of claim 15 wherein the information handling system further performs actions that include:

in response to determining that the third entity tag does not exist, sending a request to a feed server, wherein the request includes the first entity tag;

receiving a response from the feed server, wherein the response includes a new entity tag and one or more corresponding new update entries, the new entity tag including a new starting identifier and a new ending identifier; and sending the new entity tag and the one or more new update entries to the client.

17. The computer program product of claim 16 wherein the new starting identifier matches the first ending identifier.

18. The computer program product of claim 16 wherein the information handling system further performs actions that include:

storing the new entity tag and the one or more new update entries in a repository; and providing the new entity tag and the one or more new update entries to a different client.

19. The computer program product of claim 14 wherein the one or more update entries comprise entries occurring after the ending entry through a subsequent entry corresponding to the second ending identifier.

20. The computer program product of claim 14 wherein the information handling system further performs actions that include:

wherein the client is adapted to update a web feed using the one or more update entries; and wherein the client is adapted to include the second entity tag in a subsequent request.

* * * * *